US008171098B1

(12) United States Patent
Zelikov et al.

(10) Patent No.: US 8,171,098 B1
(45) Date of Patent: May 1, 2012

(54) TECHNIQUES FOR PROVIDING STORAGE SERVICES USING NETWORKED COMPUTERIZED DEVICES HAVING DIRECT ATTACHED STORAGE

(75) Inventors: Mikhail Zelikov, Needham, MA (US); John Harwood, Paxton, MA (US)

(73) Assignee: EMC Corporation, Hopkinton, MA (US)

( * ) Notice: Subject to any disclaimer, the term of this patent is extended or adjusted under 35 U.S.C. 154(b) by 1138 days.

(21) Appl. No.: 11/477,215

(22) Filed: Jun. 29, 2006

(51) Int. Cl.
*G06F 15/167* (2006.01)
(52) U.S. Cl. ........................................................ 709/213
(58) Field of Classification Search .................... 709/213
See application file for complete search history.

(56) References Cited

U.S. PATENT DOCUMENTS

| | | | |
|---|---|---|---|
| 5,809,543 A | 9/1998 | Byers et al. | |
| 5,881,311 A | 3/1999 | Woods | |
| 6,092,066 A * | 7/2000 | Ofek | 1/1 |
| 6,385,681 B1 | 5/2002 | Fujimoto et al. | |
| 6,675,268 B1 | 1/2004 | DeKoning et al. | |
| 6,687,852 B1 * | 2/2004 | McClelland et al. | 714/13 |
| 6,874,046 B1 * | 3/2005 | LeCrone et al. | 710/74 |
| 6,965,911 B1 * | 11/2005 | Coffman et al. | 709/201 |
| 6,983,349 B2 * | 1/2006 | Okumoto et al. | 711/147 |
| 2002/0049825 A1 * | 4/2002 | Jewett et al. | 709/215 |
| 2002/0073268 A1 * | 6/2002 | Peloquin et al. | 711/6 |
| 2005/0050292 A1 * | 3/2005 | Oh | 711/170 |
| 2006/0069864 A1 * | 3/2006 | Dalal et al. | 711/114 |

* cited by examiner

*Primary Examiner* — Jeffrey Pwu
*Assistant Examiner* — Saad A Waqas
(74) *Attorney, Agent, or Firm* — BainwoodHuang

(57) ABSTRACT

A method provides a storage service, and is performed on a set of computerized devices. The method includes connecting the computerized devices to a computer network. The computerized devices include direct attached storage devices (e.g., SCSI disk drives). The method further includes configuring the computerized devices to behave as hosts which individually and logically couple to an array of storage devices through a shared bus, and performing a host IO operation among the computerized devices. The host IO operation involves accessing data from a particular computerized device through the computer network to the direct attached storage devices of the computerized devices in lieu of accessing the data from the particular computerized device through an actual shared bus to an actual array of storage devices.

9 Claims, 9 Drawing Sheets

TECHNIQUES FOR PROVIDING STORAGE SERVICES USING NETWORKED COMPUTERIZED DEVICES HAVING DIRECT ATTACHED STORAGE

BACKGROUND

Conventional data storage systems tend to use a shared bus architecture to connect storage processing engines with arrays of disk drives. One example of such a shared bus architecture is the Fibre Channel (FC) fabric architecture as set forth by the Fibre Channel Industry Association (FCIA).

FIG. 1 shows a block diagram of a conventional data storage system 20 from an actual equipment perspective. That is, FIG. 1 shows the actual, real, physical equipment which forms the conventional data storage system 20. The conventional data storage system 20 includes multiple storage processing engines 22(1), 22(2), 22(3), . . . (collectively, storage processors 22), an array 24 of disk drives 26, and a switch (or arbitrated loop) 28 (e.g., a Fibre Channel switch). Each storage processor 22 has a respective physical connection 30 to the disk drive array 24 through the switch 28.

During operation, the storage processors 22 exchange data 32 with the disk drive array 24 through the switch 28 in a shared bus manner. For example, the storage processor 22(1) is capable of reading blocks of data 32(1) from and writing blocks of data 32(1) to the disk drive array 24 through the switch 28. Similarly, the storage processor 22(2) is capable of reading and writing blocks of data 32(2) through the switch 28, the storage processor 22(3) is capable of reading and writing blocks of data 32(3) through the switch 28, and so on.

As a result of the above-described physical layout for the equipment, if one storage processor 22 were to fail, that storage processor 22 would not necessarily interfere with the other devices. Rather, the remaining storage processors 22, the disk drive array 24 and the switch 28 can continue to perform data storage functions thus enabling the data storage system 20 to remain up and running as a whole.

Recently, a variety of software companies have begun offering application-level data storage solutions which run on top of the above-described equipment (e.g., for volume management, for load balancing, for regularly scheduled backups, etc.). One such software application enables the storage processors 22 to operate as a cluster of nodes which manages a set of volumes on the disk drive array 24. The nodes of the cluster are capable of operating simultaneously in an active-active manner. In the event of an equipment failure (e.g., a failed node or a failed disk drive 26), the remaining nodes communicate with each other and, in some situations, continue to manage the set of volumes on the disk drive array 24. An application which operates in a manner similar to that described above is Cluster Volume Manager (CVM) software which is offered by Oracle Corporation of Redwood Shores, Calif.

SUMMARY

Unfortunately, there are deficiencies to the above-described conventional data storage system 20. For example, the equipment of the above-described conventional data storage system 20 (i.e., the storage processors 22, the disk drive array 24, the switch 28, etc.) is comprised of real, physical dedicated components which are rigidly in place. The components do not lend themselves well to reconfiguration and are difficult to adapt to other topologies (e.g., ring configurations, irregular arrangements, etc.).

Additionally, the equipment of the conventional data storage system 20 is highly specialized and relatively expensive compared to general purpose computer equipment. For instance, the equipment may be configured solely for Fibre Channel fabric communications and thus unsuitable for other types of communications (e.g., wireless, broadband, etc.) even though there may be a particular advantage to a different type of communication (e.g., a need to put a distance between storage processors 22 which is larger than what the Fibre Channel fabric supports).

Furthermore, the above-described conventional volume management software applications operate at the application-level and thus are extremely limited in flexibility, in ways of integrating with other applications, and in the ability to leverage from operating system optimizations. For example, the volume management software application may have certain limitations which places restrictions on the number of storage processors 22 (e.g., four). As another example, the volume management software application may be unable to cooperate well with other application-level software (i.e., multiple application-level programs running conflicting tasks). Furthermore, the volume management software application may be unable to perform optimally due to restrictions on privileges and/or priority imposed by the operating system.

In contrast to the above-described conventional data storage system 20, improved data storage techniques utilize networked computerized devices having direct attached storage. The networked computerized devices are configured to behave as hosts that individually and logically couple to an array of storage devices through a shared bus. For such techniques, the networked computerized devices can be low-cost general purpose computers which communicate through a standard computer network. Nevertheless, such devices are capable of performing, in a robust and reliable manner, a variety of storage services which are offered by the higher-end specialized data storage equipment and application-level software applications (e.g., see FIG. 1). Moreover, portions of the improved techniques may be implemented at the operating system level thus enabling the techniques to provide greater flexibility, integration with other applications, and abilities to leverage off of other operating system optimizations.

One embodiment is directed to a method of providing a storage service which is performed on a set of computerized devices. The method includes connecting the computerized devices to a computer network. The computerized devices includes direct attached storage devices (e.g., SCSI disk drives). The method further includes configuring the computerized devices to behave as hosts which individually and logically couple to an array of storage devices through a shared bus, and performing a host IO operation (e.g., a write or a read operation) among the computerized devices. The host IO operation involves accessing data from a particular computerized device through the computer network to the direct attached storage devices of the computerized devices in lieu of accessing the data from the particular computerized device through an actual shared bus to an actual array of storage devices.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

The drawings are not necessarily to scale, emphasis instead being placed upon illustrating the principles of the invention.

DETAILED DESCRIPTION

Figure 1:
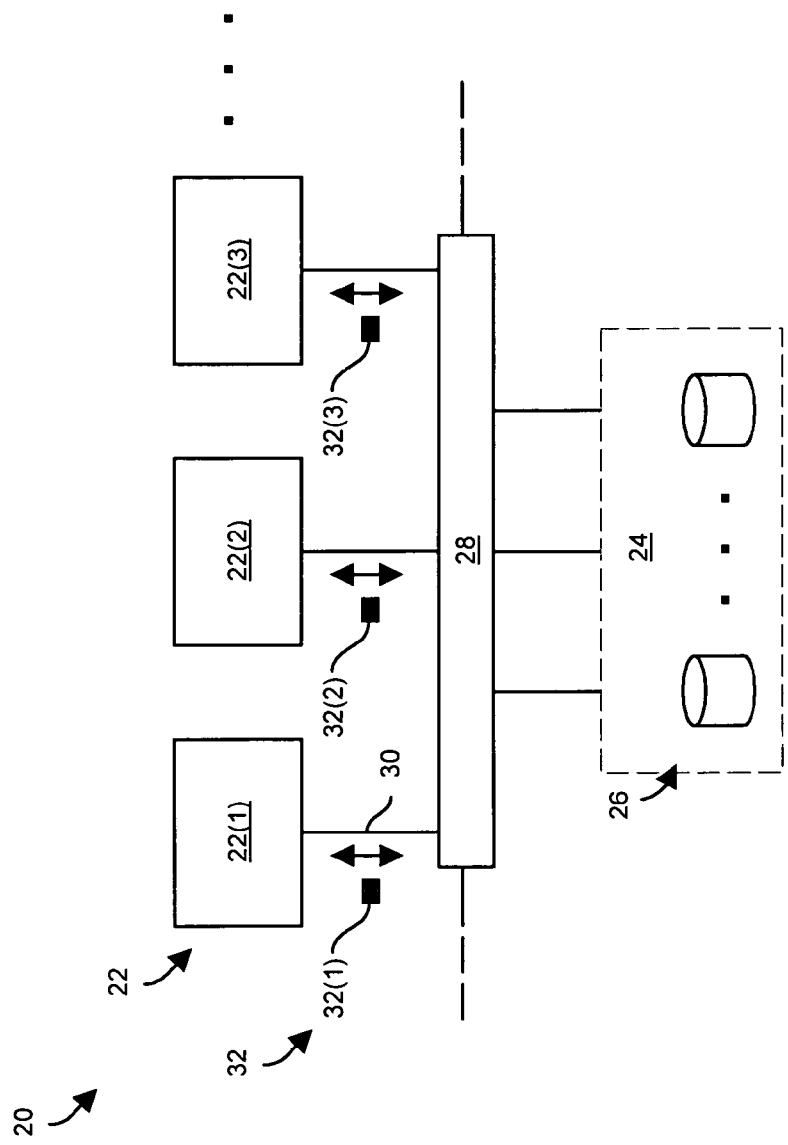
FIG. 1 is a block diagram of a conventional data storage system which connects hosts to an actual (i.e., real) storage array through an actual shared bus.

Improved data storage techniques utilize networked computerized devices having direct attached storage. The networked computerized devices are configured to behave as hosts (e.g., nodes of a volume management cluster) that individually and logically couple to an array of storage devices through a shared bus. For such techniques, the networked computerized devices can be low-cost general purpose computers which communicate through a standard computer network. Nevertheless, such devices are capable of performing, in a robust and reliable manner, a variety of storage services which are offered by higher-end specialized data storage equipment and application-level software applications (e.g., see FIG. 1). Moreover, portions of the improved techniques may be implemented at the operating system level thus enabling the techniques to provide greater flexibility, integration with other applications, and abilities to leverage off of other operating system optimizations.

Figure 2:
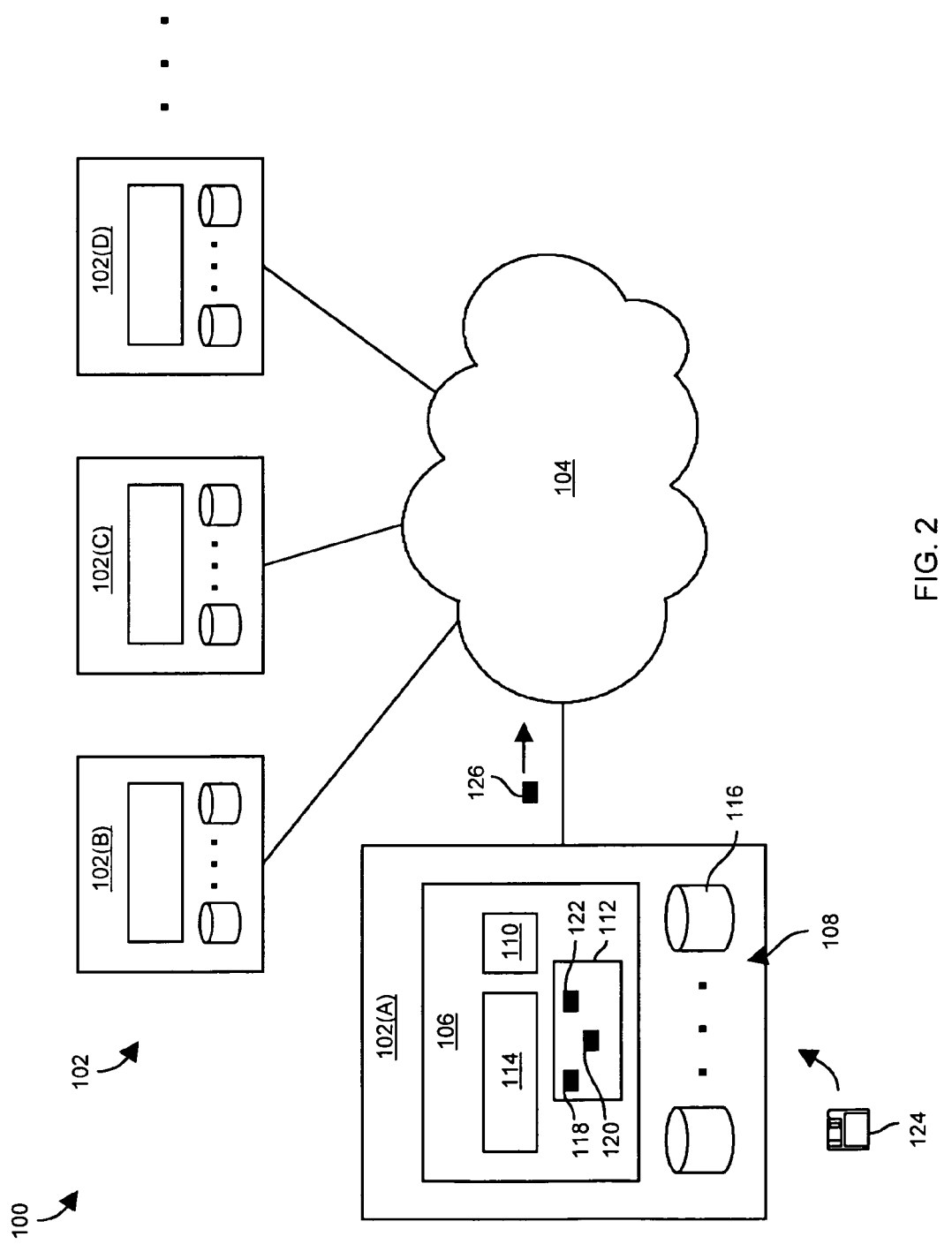
FIG. 2 is a block diagram of an electronic storage system having a set of computerized devices which provides storage services through a computer network.

FIG. 2 is a block diagram of an electronic storage system 100 which is well-suited for implementation of the above-mentioned improved techniques. The electronic storage system 100 includes a set of computerized devices 102(A), 102(B), 102(C), 102(D), . . . (collectively, computerized devices 102) and a computer network 104 which enables the computerized devices 102 to communicate with each other. The computer network 104 is capable of taking on different topologies (e.g., star, multi-drop bus, loop, irregular, combinations thereof, etc.) and utilizing a variety of communications media (e.g., the Internet, wireless communications, dedicated fiber, copper, a Wide Area Network, a Metropolitan Area Network, combinations thereof, etc.) for maximum flexibility.

As shown in FIG. 2, the computerized device 102(A) includes core circuitry 106 and direct attached storage 108. The core circuitry 106 includes a network interface 110, primary memory 112 and processing circuitry 114. The direct attached storage 108 includes a group of internally attached local disk drives 116 (e.g., SCSI disks) and is configured to provide non-volatile storage for an operating system 118, application-level programs 120 and host data 122. The network interface 110 is configured to provide connectivity from the computerized device 102(A) to the computer network 104. The primary memory 112 is configured to provide temporary caching of the operating system 118 and the application-level programs 120 which run on the computerized device 102(A), and caching of the host data 122. The processing circuitry 114 (e.g., a processor chip set) is configured to run the operating system 118 and the programs 120 in order to provide host-like storage services (i.e., to perform host read and write operations).

It should be understood that the direct attached storage 108 of the computerized device 102(A), by definition, is not directly accessible from outside the computerized device 102(A) and thus is capable of processing data storage operations (e.g., host read and write operations) exclusively from the core circuitry 106 of the computerized device 102(A). It should be further understood that the computerized device 102(A) is shown as being larger than the other computerized devices 102 in order to illustrate particular computerized device details. Nevertheless, all of the computerized devices 102 are capable of having the same general structure, i.e., all of the computerized devices 102 are capable of possessing the above-described core circuitry 106 and direct attached storage 108. To illustrate this point, each computerized device 102(B), 102(C), 102(D) is shown with a block (i.e., the core circuitry 106) and a set of storage devices (i.e., the direct attached storage 108).

In some arrangements, the operating system 118 and the application-level programs 120 are delivered to the computerized devices 102 by one or more computer program products 124. Although the computer program products 124 are illustrated as a floppy diskette icon by way of example only, a variety of communications and storage media are suitable for use (e.g., a set of CD-ROMs, tapes, memory cards or sticks, network downloads, propagated signals, combinations thereof, etc.).

It will be appreciated that each computerized device 102 has the general architecture of a low cost, general purpose computer. Nevertheless, as will be explained in further detail shortly, the core circuitry 106 of the computerized device 102(A) is specifically and purposefully constructed and arranged (e.g., by running specialized software) to work with the core circuitry 106 of other computerized devices 102 (e.g., other low cost general purpose computers) in order to provide storage services similar to those offered by more expensive, higher-end specialized data storage equipment such as the earlier-described conventional data storage system 20 shown in FIG. 1. As a result, during operation, the computerized devices 102 are capable of behaving as hosts which individually and logically couple to an array of storage devices through a shared bus (e.g., see FIG. 1) although such an array and shared bus may not actually exist to keep costs down. In particular, the computerized devices 102 are capable of carrying out host write operations by virtue of exporter modules which export the direct attached storage 108 from the computerized devices 102 and importer modules which import the direct attached storage 108 of other computerized devices 102. These exporter and importer modules are formed by the core circuitry 106 within each computerized device 102 (i.e., the processing circuitry 114 running the operating system 118). Accordingly, a particular computerized device 102 is capable of writing and reading data 126 through the computer network 104 to the direct attached storage devices 108 in lieu of writing and reading the data 126 from the particular computerized device 102 through an actual shared bus (e.g., see the switch 28 in FIG. 1) to an actual array of storage devices (e.g., see the disk drive array 24 in FIG. 1). Further details will now be provided with reference to FIG. 3.

Figure 3:
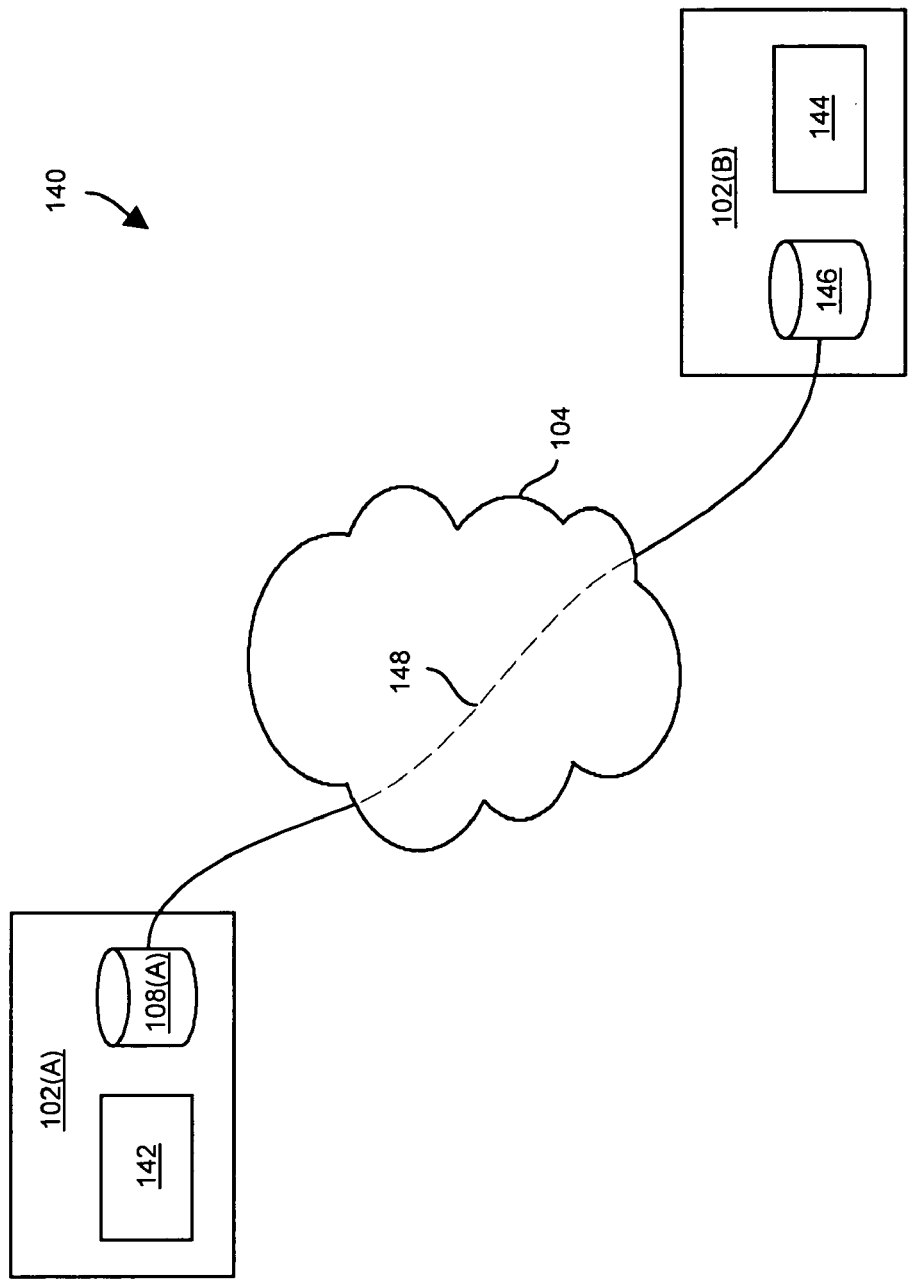
FIG. 3 is a block diagram of a portion of the electronic storage system of FIG. 2.

FIG. 3 shows a portion 140 of the electronic storage system 100 to illustrate how one computerized device 102 can acquire access to the direct attached storage 108 of another computerized device 102. The portion 140 includes two computerized devices 102 and the computer network 104. By way of example only, the computerized devices 102(A), 102(B) are the two devices. As shown, the computerized device 102(A) includes an exporter module 142 (or simply exporter 142) and at least part (e.g., a partition) of the direct attached storage 108(A) on the computerized device 102(A). The computerized device 102(B) includes an importer module 144 (or simply importer 144). The exporter 142 and the importer 144 operate to present an available logical local disk 146 on the computerized device 102(B) which is actually remote access to the exported direct attached storage 108(A) of the computerized device 102(A).

The exporter 142 is formed by the processing circuitry 114 of the computerized device 102(A) executing its operating system 118. The exporter 142 is configured to export local SCSI disks of the direct attached storage 108(A) as multiple shared bus devices, or consolidated as a single shared bus device. In either situation, the exporter 142 is configured to provide access control for partitions of local SCSI disks. In some arrangements, the operating system 118 is Windows® provided by Microsoft Corporation of Redmond, Wash. and the exporter 142 is implemented as a SCSI disk class Windows PnP (Plug-N-Play) filter driver between the function and root drivers of a SCSI disk.

Similarly, the importer 144 is formed by the processing circuitry 114 of the computerized device 102(B) executing its operating system 118. The importer 144 is configured to import remote SCSI disks of other computerized devices 102 as multiple shared bus devices, or consolidated as a single shared bus device. In either situation, the importer 144 is configured to provide an abstraction layer for protected (virtual) devices. In some Windows arrangements, the importer 144 is implemented as a SCSI disk Windows Bus PnP driver.

The communications between the exporter 142 and the importer 144 through computer network 104 are through asynchronous, bi-directional and multithreaded pathways 148. In some arrangements, the computer network 104 is configured to handle TCP/IP communications. Further details will now be provided with reference to FIG. 4.

Figure 4:
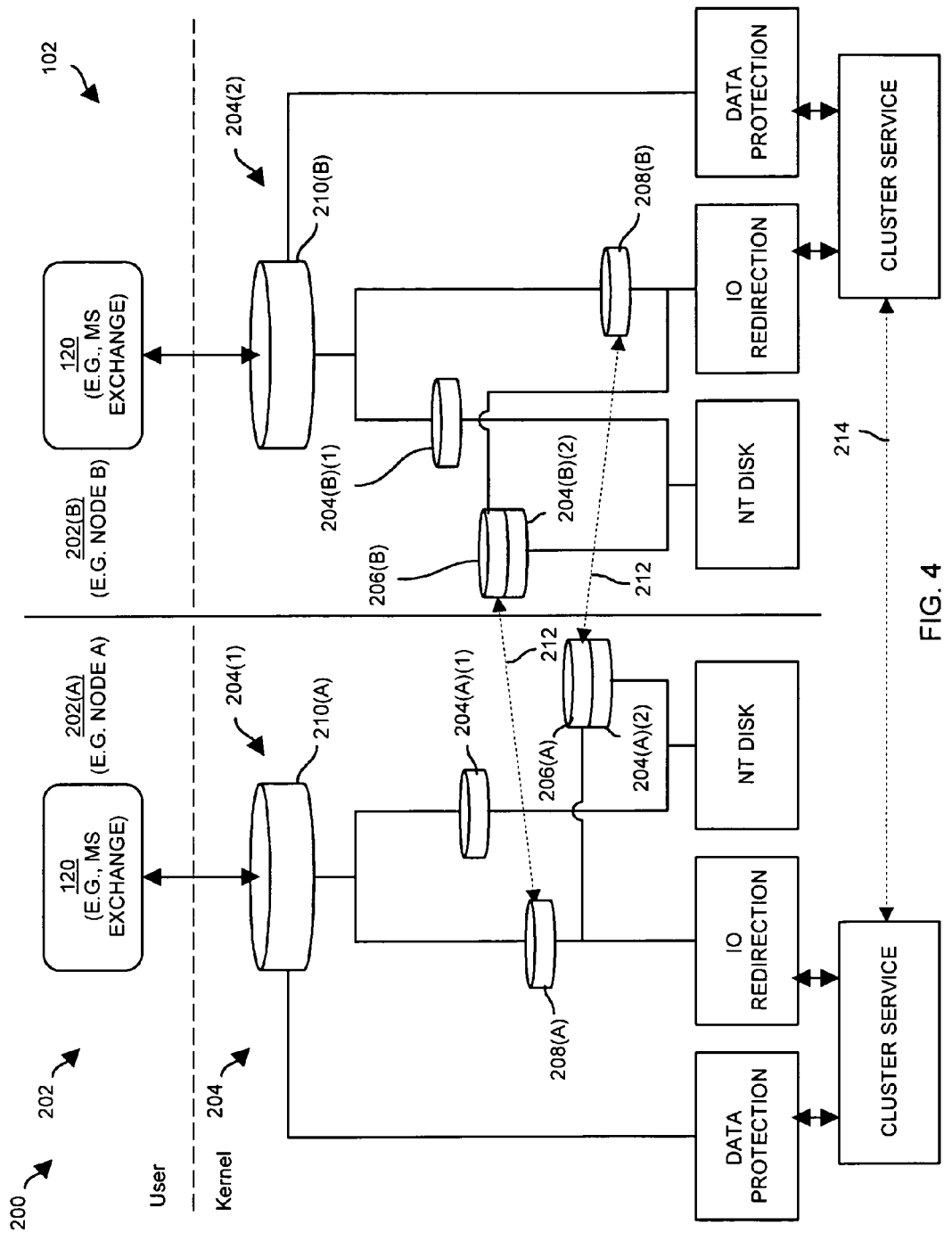
FIG. 4 is a block diagram of a logical configuration which is capable of being provided by the electronic storage system of FIG. 2.

FIG. 4 shows an exemplary configuration 200 which is capable of being provided by the electronic storage system 100. The configuration 200 includes two computerized devices 102 which operate as nodes 202(A), 202(B) (collectively, nodes 202) to form a cluster. A user-level application 120 (e.g., Microsoft Exchange® provided by Microsoft Corporation of Redmond, Wash.) runs on each node 202. A variety of storage-related services exist at the Kernel level including data protection, 10 redirection, Windows NT disk support and cluster service.

As shown in FIG. 4, the node 202(A) includes, as its direct attached storage 108, two local SCSI disks 204(A)(1) and 204(A)(2). The SCSI disk 204(A)(1) stores the operating system 118 and the application-level program 120 for the node 202(A). The exporter 142 running on the node 202(A) presents the local SCSI disk 204(A)(2) as a logical export access point which is shown as an export disk 206(A) for other computerized devices 102 (e.g., the node 202(B)) to access. Additionally, the importer 144 (FIG. 3) running on the node 202(A) provides an import entry point which is shown as an import disk 208(A) (also see the logical local disk 146 in FIG. 3) for remotely accessing the logical export access point of another computerized device 102 (e.g., the export disk 208(B) of the node 202(B)). Furthermore, the operating system of the node 202(A) is configured to present both the local SCSI disk 204(A)(1) and the import disk 208(A) as a protected logical abstraction 210(A) (e.g., a logical disk object) to the application 120 running at the user level in node 202(A).

Likewise, the node 202(B) includes, as its direct attached storage 108, two local SCSI disks 204(B)(1) and 204(B)(2). The SCSI disk 204(B)(1) stores the operating system 118 and the application-level program 120 for the node 202(B). The exporter 142 running on the node 202(B) presents the local SCSI disk 204(B)(2) as a logical export access point which is shown as an export disk 206(B) for other computerized devices 102 (e.g., the node 202(A)) to access. Additionally, the importer 144 (FIG. 3) running on the node 202(B) provides an import entry point which is shown as an import disk 208(B) for remotely accessing the logical export access point of another computerized device 102 (e.g., the export disk 206(A) of the node 202(A)). Furthermore, the operating system of the node 202(B) is configured to present both the local SCSI disk 204(B)(1) and the import disk 208(B) as a protected logical abstraction 210(B) to the application 120 running at the user level in node 202(B).

As further shown in FIG. 4, private access links 212 extend between the export disks 206(A), 206(B) and the import disks 208(A), 208(B) in order to enable remote access through the computer network 104 (also see FIG. 2). Formation of these private access links 212 is initiated by the importer 144 running on the nodes 202. Also, a communications pathway 214 through the computer network may also exist to enable further coordination of cluster services. Further details will now be available with reference to FIG. 5.

Figure 5:
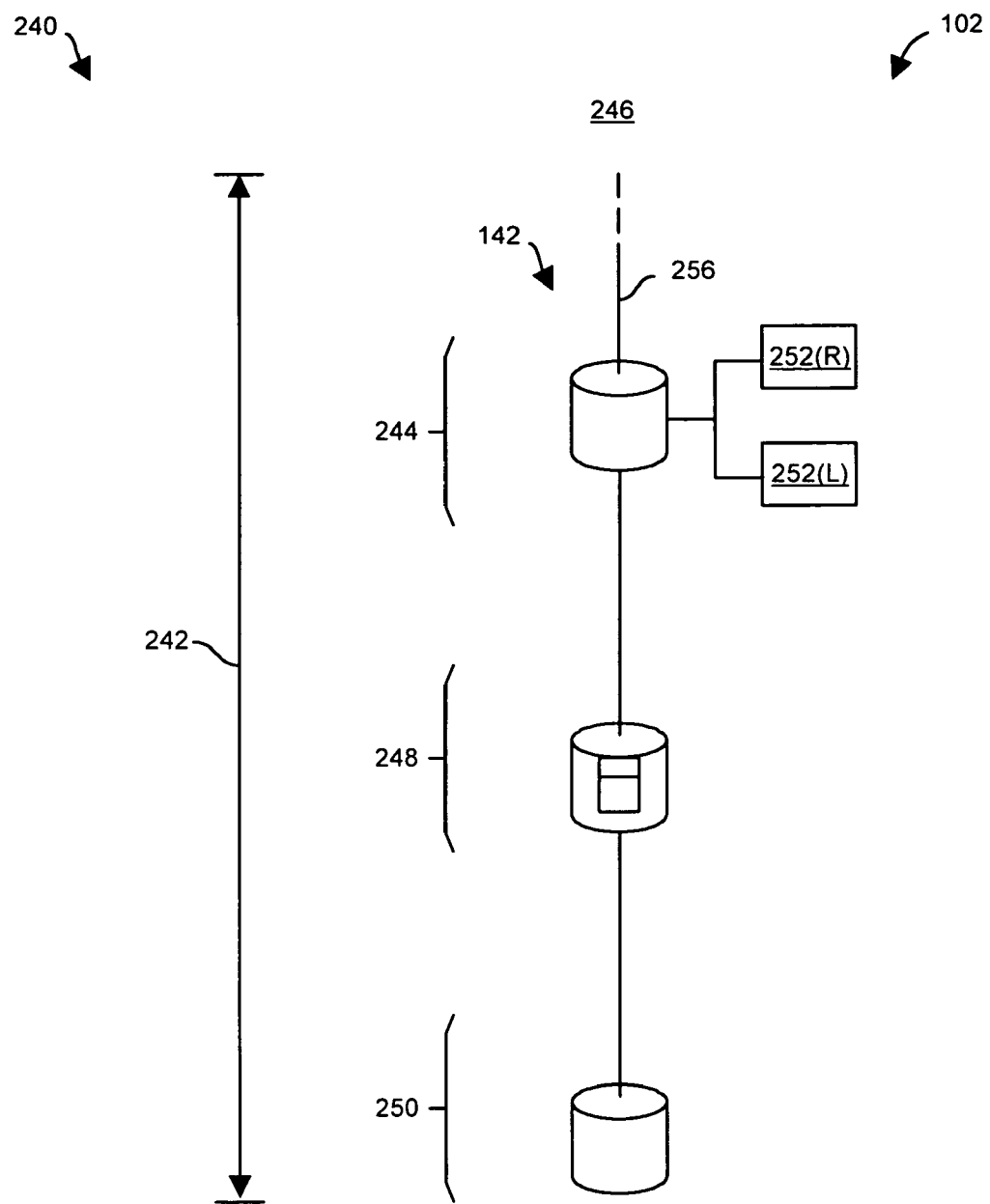
FIG. 5 is a device driver stack view of a particular computerized device involved in exporting a SCSI disk.

FIG. 5 is a view 240 of the device driver stack 242 for a computerized device 102 which is involved in exporting a portion of direct attached storage 108 to another computerized device 102. It should be understood that the view 240 is Windows OS specific, and that other operating systems are suitable for use as well and such other operating systems will have a different view. As shown, the exporter module 142 is implemented as an upper layered or filter driver 244 (or export filter driver 244) which installs and then resides between the upper level drivers 246 and the disk class driver 248 leading to an actual local SCSI disk 250 (e.g., also see the export disks 206(A), 206(B) in FIG. 4).

As shown in FIG. 5, the exporter module 142 of the computerized device 102 is configured to provide a remote access point 252(R) to which the importers 144 running on other computerized devices 102 can connect in order to access the SCSI disk 250. The exporter module 142 is further configured to provide a local access point 252(L) (i.e., a private disk link) which offers local access to the SCSI disk 250.

The following is a description of how the exporter module 142 is utilized within the computerized device 102 during a configuration procedure performed by a user. In some arrangements, a user performs the procedure manually. In other arrangements, the user starts the procedure (e.g., as part of an initialization process) and then the procedure runs automatically (e.g., via a script or program). In either situation, first a discovery task is performed in which the SCSI disk 250 is detected as an un-initialized local disk within the computerized device 102. Next, as part of an initialization task, a private initialization record is written. Also, as part of the initialization task, a local private device link 252(L) is created which enables access to the SCSI disk 250. At this point, the SCSI disk 250 is ready for export and local JO access to the SCSI disk through the traditional link 256 from the upper level drivers 246 is disabled. Next, a remote access point 252(R) is created through which another computerized device 102 can reach the SCSI disk 250. Further details will now be provided with reference to FIG. 6.

Figure 6:
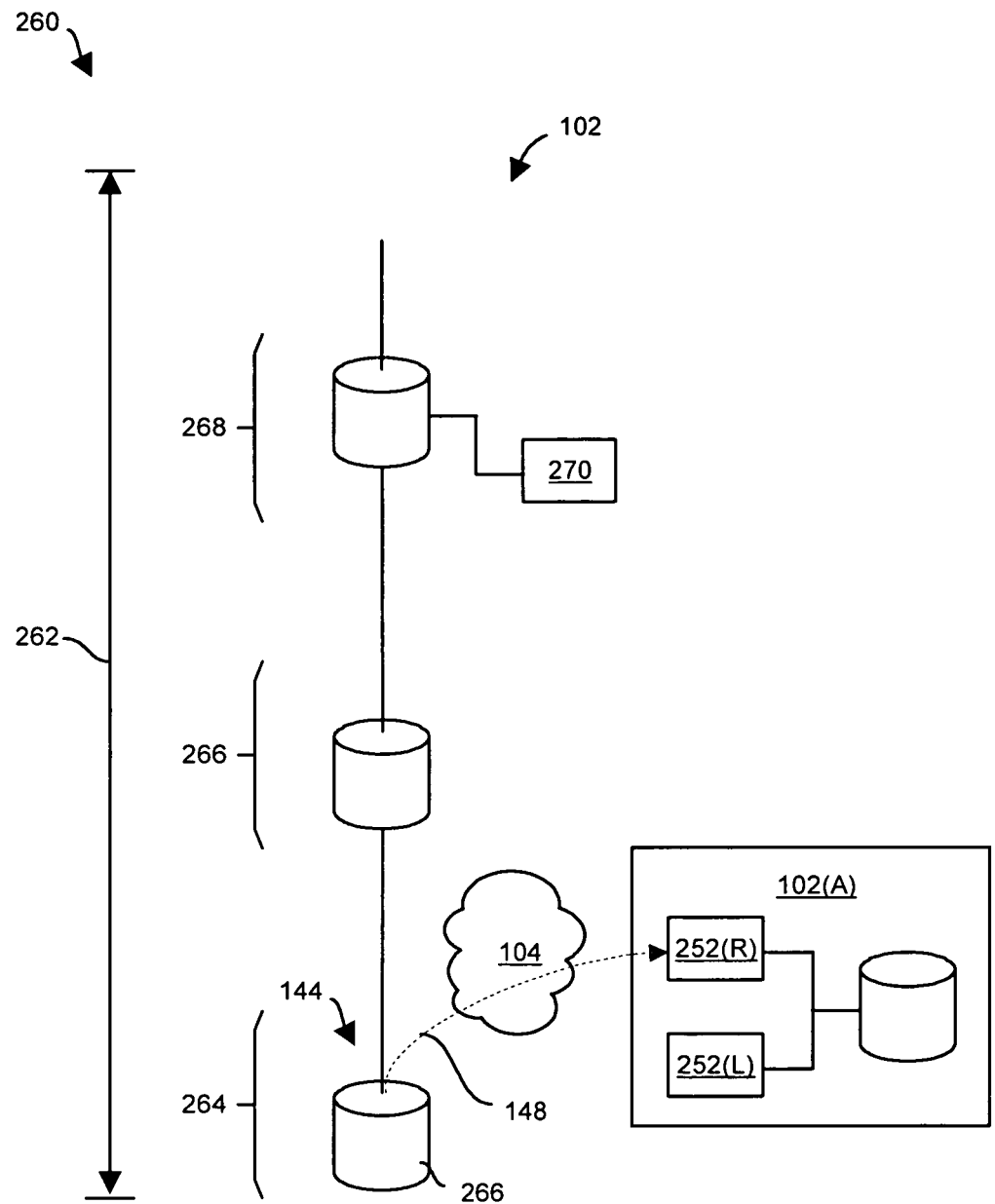
FIG. 6 is a device driver stack view of another computerized device involved in importing the SCSI disk of FIG. 5.

FIG. 6 is a view 260 of the device driver stack 262 for a computerized device 102 which is involved in importing a portion of direct attached storage 108 from another computerized device 102. As shown, the importer module 142 is implemented as a virtual SCSI disk controller bus PnP driver 264 (or import driver 264) which installs and then resides at the bottom of the device driver stack 262 (e.g., also see the import disks 208(A), 208(B) in FIG. 4). As further shown, the import driver 264 sits below a disk class driver 266 and a disk export driver 268 which exists to provide an entry point 270 to the importer module 144.

As shown in FIG. 6, the importer module 144 of the computerized device 102 is configured to provide import access to a remote SCSI disk 250 running on other computerized devices 102 (a computerized device 102(A), also see FIG. 3). Such import access is through a communications pathway 148 through the computer network 104 (also see FIG. 3).

The following is a description of how the importer module 144 is utilized within the computerized device 102 during a configuration procedure performed by a user. In some arrangements, a user performs the procedure manually. In other arrangements, the user starts the procedure (e.g., as part of an initialization process) and then the procedure runs automatically (e.g., via a script or program). In either situation, in response to issuance of an import task, the import driver 264 creates a logical local disk 266 and verifies capabilities for remote access to the computerized network 104. Next, a private access link 148 is created from the logical local disk 266 (i.e., the import entry point) to the remote access point 252(R) on another computerized device 102. Accordingly, the computerized device 102 now provides access (through the entry point 270) to direct attached storage 108 on another computerized device 102. As a result, the computerized devices 102 are capable of working with each other to carry out host operations (e.g., host write and read operations) which involve accessing data from a particular computerized device 102 through the computer network 104 to the direct attached storage devices 108 of the computerized devices 102 in lieu of accessing the data from the particular computerized device 102 through an actual shared bus to an actual array of storage devices. Further details will now be provided with reference to FIG. 7.

Figure 7:
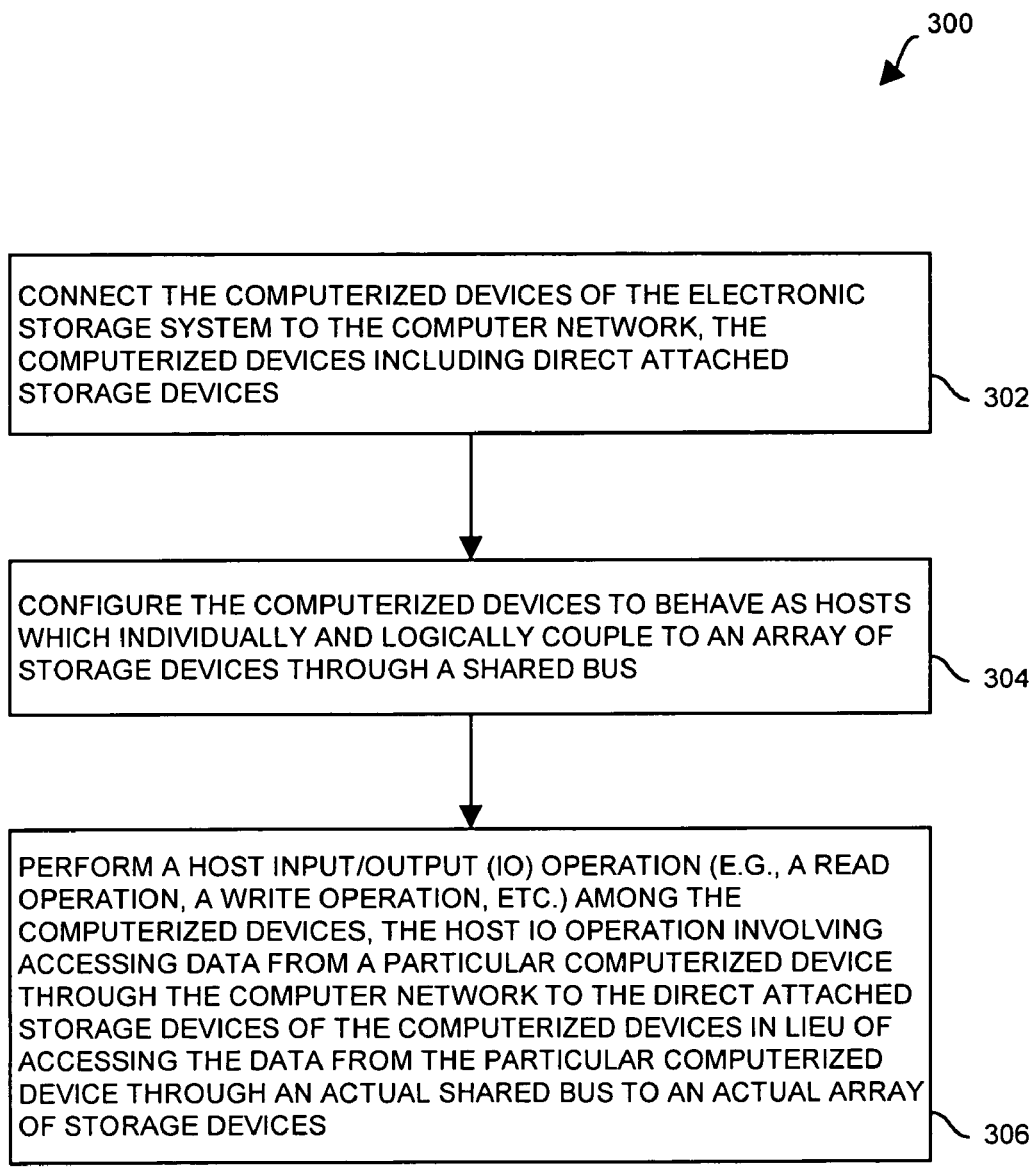
FIG. 7 is a flowchart of a procedure which is performed on the electronic storage system of FIG. 2.

FIG. 7 is a flowchart of a procedure 300 which is performed by a user when using the electronic storage system 100 to provide a storage service. In step 302, the user connects the computerized devices 102 to the computer network 104. As mentioned earlier and as shown in FIG. 2, the computerized devices 102 include direct attached storage 108 (e.g., local SCSI devices 116).

In step 304, the user configures the computerized devices 102 to behave as hosts which individually and logically couple to an array of storage devices through a shared bus. Here, the user installs the exporter 142 and importer 144 among the computerized devices as explained above in connection with FIGS. 5 and 6. At this point, the direct attached storage 108 of one computerized device 102 is now accessible remotely from another computerized device 102 (also see FIG. 3).

In step 306, the user performs a host IO operation (e.g., a read operation, a write operation, etc.) among the computerized devices 102. The host IO operation involves accessing data from a particular computerized device 102 (e.g., the computerized device 102(A) in FIG. 3) through the computer network 104 to the direct attached storage devices 108 of the computerized devices 102 (e.g., the computerized device 102 (B) in FIG. 3) in lieu of accessing the data from the particular computerized device through an actual shared bus to an actual array of storage devices. Accordingly, the computerized devices 102 are able to carry out host 10 functionality (e.g., writing data for a write operation) without requiring actual specialized data storage equipment (e.g., see FIG. 1). Rather, the computerized devices 102 can be low cost general purpose computers with local disk storage and with importer and exporter drivers that simply provide host write and read functionality. In some arrangements, a write operation may further include locally writing to a SCSI disk 116 (e.g., on the computerized device 102(A) in FIG. 3) such as in the case of mirrored writes. Further details will now be provided with reference to the following example of a 3-way mirror configuration.

Figure 8:
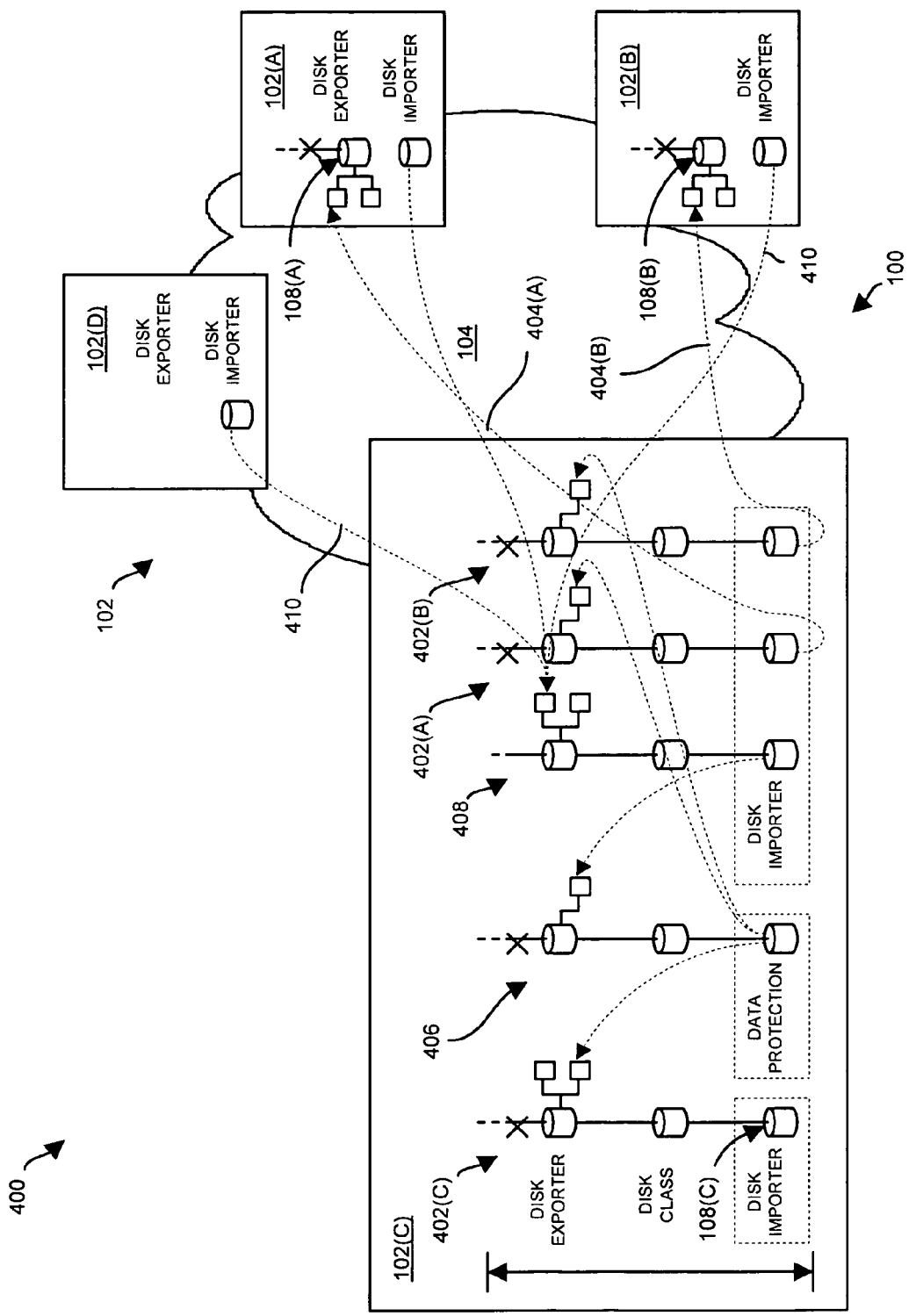
FIG. 8 is a block diagram of a 3-way mirror implemented by the electronic storage system of FIG. 2.

FIG. 8 is a block diagram of a 3-way mirror configuration 400 which is implemented by the electronic storage system 100 of FIG. 2. The computerized device 102(C) is considered the "master" in that it is responsible for coordinating access to a 3-way mirror. Along these lines, the computerized device 102(C) has access to direct attached storage on three computerized devices 102. Namely, a disk importer end of a disk abstraction 402(A) links to direct attached storage 108(A) on device 102(A) via computer network pathway 404(A). Similarly, a disk importer end of a disk abstraction 402(B) links to direct attached storage 108(B) on device 102(B) via computer network pathway 404(B). It is worthy to note that a disk abstraction 402(C) (i.e., the driver stack) also exists within the computerized device 102(C) even though the direct attached storage 108(C) is local.

The local access point of a disk exporter end (i.e., the layered or filter driver operating as an exporter) of each disk abstraction 402(A), 402(B) and 402(C) then links to the disk importer end of a data protection abstraction 406. The data protection abstraction 406 is configured to provide consolidated, protected access to the mirror components of the 3-way mirror. The disk exporter end of the data protection abstraction 406 then links to another disk abstraction 408 which is made available to each computerized device 102. Such availability by the computerized device 102(C) is illustrated by the omission of an "x" over at the top of the stack of the disk abstraction 408. Furthermore, disk importers on the other computerized devices 102 link to the disk abstraction 408 through the pathways 410 of the computer network 104 so that each computerized device 102 has access to the 3-way mirror. Accordingly, the computerized devices 102 are capable of performing host IO operations which are seemingly to an actual shared array of storage devices through an actual switch even though the accesses are to the direct attached storage 108(A), 108(B), 108(C) on the computerized devices 102 themselves.

Figure 9:
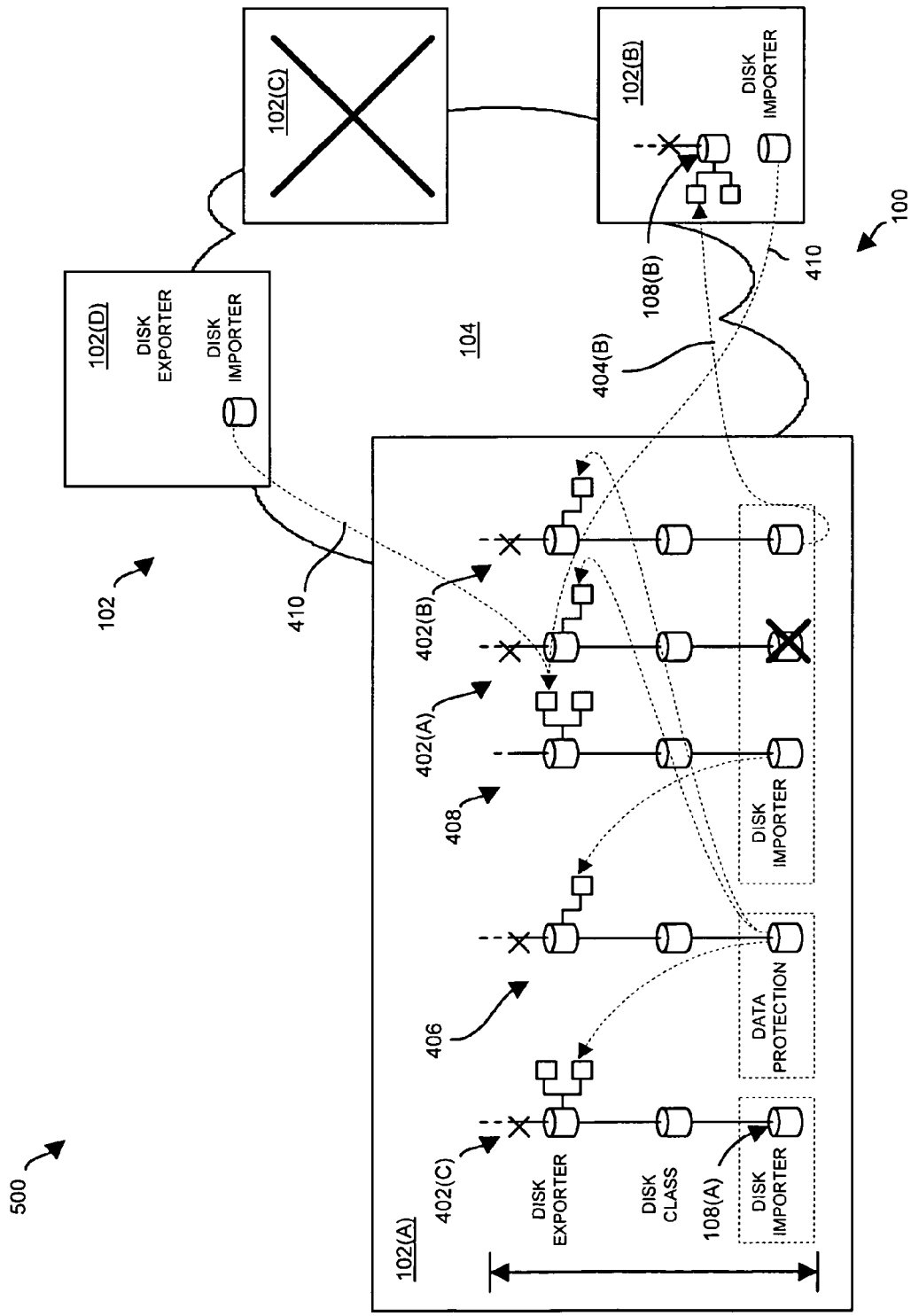
FIG. 9 is a block diagram of a fail-over configuration for the 3-way mirror of FIG. 8.

FIG. 9 is a block diagram of a fail-over configuration 500 for the 3-way mirror of FIG. 8. Here, the computerized device 102(C), which had operated as the "master", has now failed. The other computerized devices 102 have detected the loss (e.g., via loss of communication with the computerized device 102(C)) and constructed abstractions on the computerized device 102(A), i.e., the "backup master" for the computerized device 102(C). Furthermore, the remaining computerized devices 102 have established links to the computerized device 102(A) to import the re-established mirror.

As a result of the computerized device 102(C) being faulted, the electronic storage system 100 as a whole continues to operate. In particular, the direct attached storage devices 108(A), 108(B) continue to operate as a mirror and thus robustly store data on behalf of the remaining computerized devices 102. Accordingly, the electronic storage system 100 is well-suited for operating in a cluster environment and providing volume management services in support thereof thus serving as a viable alternative to conventional data storage systems having specialized, higher-end equipment (e.g., see FIG. 1).

As mentioned above, improved data storage techniques utilize networked computerized devices 102 having direct attached storage 108. The networked computerized devices 102 are configured to behave as hosts (e.g., nodes of a volume management cluster) that individually and logically couple to an array of storage devices through a shared bus. For such techniques, the networked computerized devices 102 can be low-cost general purpose computers which communicate through a standard computer network 104. Nevertheless, such devices 102 are capable of performing, in a robust and reliable manner, a variety of storage services which are offered by higher-end specialized data storage equipment and application-level software applications (e.g., see FIG. 1). Moreover, portions of the improved techniques may be implemented at the operating system level thus enabling the techniques to provide greater flexibility, integration with other applications, and abilities to leverage off of other operating system optimizations.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the electronic storage system 100 was described above as providing a mirror configuration by way of example only in order to illustrate various capabilities and benefits of certain embodiments of the invention. It should be understood that the various features described above are well-suited for implementing other functionality as well such as many other erasure code style operations. Such enhancements and modifications are intended to belong to various embodiments of the invention.

What is claimed is:

1. On a set of computerized devices, a method of providing a storage service, the method comprising:
    connecting the computerized devices to a computer network, the computerized devices including direct attached storage devices;
    configuring the computerized devices to behave as hosts which individually and logically couple to an array of storage devices through a shared bus; and
    performing a host IO operation among the computerized devices, the host IO operation involving accessing data from a particular computerized device through the computer network to the direct attached storage devices of the computerized devices;
    wherein direct attached storage of a first computerized device includes a disk;
    wherein configuring the computerized devices includes:
        exporting a partition of the disk from the first computerized device; and
        importing the partition of the disk to a second computerized device;
    wherein exporting the partition of the disk from the first computerized device includes controlling direct local IO access to the partition of the disk and providing a logical export access point on the first computerized device to enable exporting of the partition of the disk from the first computerized device; and
    wherein the method further comprises:
        exporting a partition of another disk from another computerized device; and
        importing the partition of the other disk on the first computerized device to provide access to a mirror through the first computerized device;
        wherein the other computerized device is the second computerized device;
    wherein controlling the direct local IO access and providing the logical export access point includes:
        installing, on the first computerized device, an export layered driver between a function driver and a root driver of the disk, wherein the function driver, the export layered driver, and the root driver comprise a device driver stack.

2. An electronic storage system to provide a storage service, the electronic storage system comprising:
    computerized devices having direct attached storage devices, the computerized devices being constructed and arranged to:
        connect to a computer network,
        behave as hosts which individually and logically couple to an array of storage devices through a shared bus, and
        perform a host IO operation among the computerized devices, the host IO operation involving accessing data from a particular computerized device through the computer network to the direct attached storage devices of the computerized devices;
    wherein direct attached storage of a first computerized device includes a disk;
    wherein the computerized devices, when behaving as the hosts, are configured to:
        export a partition of the disk from the first computerized device; and
        import the partition of the disk to a second computerized device;
    wherein the first computerized device is configured to control direct local IO access to the partition of the disk and provide a logical export access point to enable exporting of the partition of the disk from the first computerized device; and
    wherein the computerized devices, when behaving as the hosts, are further configured to:
        export a partition of another disk from another computerized device; and
        import the partition of the other disk on the first computerized device to provide access to a mirror through the first computerized device;
        wherein the other computerized device is the second computerized device;
    wherein the first computerized device, when controlling the direct local IO access and providing the logical export access point, is configured to:
        receive installation of an export layered driver between a function driver and a root driver of the disk, wherein the function driver, the export layered driver, and the root driver comprise a device driver stack.

3. A system of distributing a disk array, the system comprising:
    a network; and
    at least three computerized devices connected to the network, each computerized device including:
        a network interface for connecting to the network;
        at least one local disk that is a member of the distributed disk array; and
        logic that is configured to:

export the local disk that is the member of the distributed disk array to be remotely accessible by each of the other computerized devices across the network as a logical disk with block-level access; and import logical disks with block-level access from each of the other computerized devices across the network;

wherein the logic configured to export the local disk includes an export layered driver between a function driver and a root driver of the local disk, wherein the function driver, the export layered driver, and the root driver comprise a device driver stack.

4. A system as in claim 3 wherein the logic on each of the computerized devices includes:
an operating system;
an exporter module which runs on top of the operating system; and
an importer module which runs on top of the operating system.

5. A system as in claim 4 wherein the exporter module includes:
a disk class driver which directly accesses the local disk that is the member of the distributed disk array; and
a filter driver, which operates between the disk class driver and upper level application drivers, wherein the filter driver provides:
a private disk link, which provides local access to the disk class driver; and
a remote disk link, which provides remote access across the network to the disk class driver, the remote disk link providing access across the network through which any of the other computerized devices can communicate with the local disk on a block-level basis as a logical drive.

6. A system as in claim 3 wherein:
a first computerized device of the three computerized devices:
imports, as a first disk abstraction with a first importer module, a first logical disk from a second computerized device of the three computerized devices;
imports, as a second disk abstraction with a first importer module, a second logical disk from a third computerized device of the three computerized devices;
provides consolidated protected access, through a data abstraction module, to an exporter module of the first disk abstraction, an exporter module of the second disk abstraction, and to an exporter module of the local disk; and
exports mirrored access, on a block-level basis, to the first and second disk abstractions and the local disk, through an exporter module of the data abstraction module;
wherein the first, second, and third computerized devices are all distinct from each other; and
wherein the first and second disk abstractions and the local disk function as a three-way mirror;
the second computerized device:
exports, through its exporter module, its local disk to be accessible by the first importer module of the first computerized device as the first disk abstraction; and
imports, through its importer module, access to the three-way mirror from the exporter module of the data abstraction module of the first computerized device; and
the third computerized device:
exports, through its exporter module, its local disk to be accessible by the first importer module of the first computerized device as the second disk abstraction; and
imports, through its importer module, access to the three-way mirror from the exporter module of the data abstraction module of the first computerized device.

7. A method as in claim 1 wherein importing the partition of the disk to the second computerized device includes:
providing a logical local disk object on the second computerized device to present an available logical local disk on the second computerized device.

8. An electronic storage system as in claim 2 wherein the second computerized device is configured to:
provide a logical local disk object to present an available logical local disk on the second computerized device.

9. A system as in claim 6 wherein, the second computerized device is configured to, upon detecting that the first computerized device has failed:
import, as a third disk abstraction with its importer module, the second logical disk from the third computerized device;
provide consolidated protected access, through another data abstraction module, to an exporter module of the third disk abstraction, and to an exporter module of its local disk; and
export mirrored access, on a block-level basis, to the third disk abstraction and the local disk, through an exporter module of the other data abstraction module; and
wherein third disk abstraction and the local disk function as a re-established two-way mirror.

\* \* \* \* \*